United States Patent Office 3,409,578
Patented Nov. 5, 1968

3,409,578
POWDERED WATER-INSOLUBLE POLYMERS DISPERSIBLE IN AQUEOUS MEDIA AND METHODS OF MAKING THEM
Jesse C. H. Hwa, Stamford, Conn., assignor to Rohm & Haas Company, Philadelphia, Pa., a corporation of Delaware
No Drawing. Continuation-in-part of application Ser. No. 273,312, Apr. 16, 1963. This application July 14, 1965, Ser. No. 472,059
25 Claims. (Cl. 260—29.6)

This application is a continuation-in-part of my copending application for U.S. letters patent Ser. No. 273,312, filed Apr. 16, 1963, and now abandoned.

The present invention is concerned with the preparation of dry particulate water-insoluble film-forming polymers adapted to be directly dispersed in water.

Fikentscher et al., alien property custodian Serial No. 397,138 (in the United States) discloses the deposition of particles of an emulsion polymer which is so hard that it is incapable of forming a film on deposition at room temperature. By the process of this reference, however, the particles that are deposited, though not coalesced to a film, do clump together during deposition so that the particles deposited are essentially aggregates of the individual dispersed particles of the original latex. Furthermore, on redispersion, these aggregates generally do not break up to any extent so that the size of the particles that are redispersed is quite large as compared to the size of the particles in the original latex. For many purposes, particularly when a polymer is to be distributed within other materials, the failure to be redispersed in the original small particle size is quite a disadvantage because of the interference with adequate distribution and uniformity in the final mixed products. In addition, the process of this earlier reference has the disadvantage that it is capable of handling only polymers which are not film-forming at room temperature.

In accordance with the present invention, it has been found that it is possible to form dry pulverulent water-insoluble polymers from a latex thereof whether or not the polymer is capable of forming a film at room temperature and to form such dry powdered masses which are capable of being redispersed in aqueous media to form essentially the same distribution of particle sizes in the redispersion as in the original latex.

In accordance with the present invention, it is necessary that the latex contain carboxylate groups in a member selected from the group consisting of the dispersed polymer and the dispersant therefor or in both the polymer and the dispersant. The carboxylate groups referred to may be in acid form or in the form of a monovalent metal salt, such as an alkali metal including sodium, potassium, or lithium or an ammonium salt.

The polymer with which the invention is concerned may be any type of emulsion polymer obtained by conventional emulsion polymerization processes and of any desired molecular weight obtainable with or without the use of a chain transfer agent. Examples of monomers that may be employed in forming the polymer include vinyl esters of fatty acids having from 1 to 18 carbon atoms, especially vinyl acetate; the nitriles, amides, and esters of acrylic acid or methacrylic acid such as acrylonitrile, methacrylonitrile, acrylamide, methacrylamide, N-methyl acrylamide, N-methylol acrylamide, N-methoxy-methyl acrylamide, and the saturated monohydric alcohol esters of acrylic acid and methacrylic acid including those derived from methanol, ethanol, isopropanol, n-butanol, isobutanol, tertiary-butanol, secondary butanol, cyclohexanol 2-ethylhexyl alcohol, tert-octyl alcohol, dodecanol, hexadecanol, and octadecanol. Other monomers include vinyl chloride, vinylidene chloride, styrene, vinyltoluene, ethylene and isobutylene. Dienes such as isoprene, chloroprene, or butadiene may be employed, especially in the form of the common synthetic rubber copolymers with acrylonitrile, styrene, and the like, but the diene polymers employed should be of film-forming character, that is, they should be essentially linear rather than cross-linked.

The polymer may contain hydrophilic or polar groups in an amount which would be insufficient to render the polymer soluble in water. This limitation on solubility would therefore limit the amount of methacrylamide or acrylamide or similar monomers of hydrophilic character just mentioned. Within the limits of water-insolubility as mentioned, other functional monomers may be employed including those containing amine, hydroxyl or carboxyl groups, as well as other amide groups besides those already specifically named. Examples of amine groups include N-dimethylaminoethyl-acrylamide or -methacrylamide, and diethylaminoethyl acrylate, methacrylate, vinyl ether, or vinyl sulfide. Examples of hydroxyl-containing monomers include $\beta$-hydroxyethyl vinyl ether or the analogous vinyl sulfide, acrylate, methacrylate, or N-substituted acrylamide or methacrylamide. The analogous hydroxyalkyl-containing compounds may also be used, examples of which include $\beta$-hydroxypropyl and 3-hydroxypropyl acrylate or methacrylate. The polymer may contain any of the acids mentioned hereinafter within the limits of water-insolubility of the resulting copolymer.

Either non-ionic or anionic emulsifiers or dispersing agents may be used in the preparation of the emulsion polymers.

Suitable anionic dispersing agents include the higher fatty alcohol sulfates, such as sodium lauryl sulfate, alkylaryl sulfonates, e.g., sodium or potassium isopropylbenzene sulfonates or isopropyl naphthalene sulfonates, alkali metal higher alkyl sulfosuccinates, e.g. sodium octyl sulfosuccinate, sodium N-methyl-N palmitoyltaurate, sodium oleyl isothionate, alkali metal salts of alkylarylpolyethoxyethanol sulfates or sulfonates, e.g., sodium t-octyl-phenoxypolyethoxyethyl sulfate having 1 to 5 oxyethylene units.

Suitable non-ionic dispersing agents include the following: alkylphenoxypolyethoxyethanols having alkyl groups of about seven to eighteen carbon atoms and 6 to 60 or more oxyethylene units, such as heptylphenoxypolyethoxyethanols, octylphenoxypolyethoxyethanols, methyloctylphenoxypolyethoxy - ethanols, nonylphenoxypolyethoxyethanols, dodecylphenoxypolyethoxy ethanols, and the like; polyethoxyethanol derivatives of methylene linked alkyl phenols; sulfur-containing agents such as those made by condensing 6 to 60 or more moles of ethylene oxide with nonyl, dodecyl, tetradecyl, t-dodecyl, and the like mercaptans or with alkylthiophenols having alkyl groups of six to fifteen carbon atoms; ethylene oxide derivatives of long-chained carboxylic acids, such as lauric, myristic, palmitic, oleic, and the like or mixtures of acids such as found in tall oil containing 6 to 60 oxyethylene units per molecule; analogous ethylene oxide condensates of long-chained alcohols, such as octyl, decyl, lauryl, or cetyl alcohols, ethylene oxide derivatives of etherified or esterified polyhydroxy compounds having a hydrophobic hydrocarbon chain, such as sorbitan monostearate containing 6 to 60 oxyethylene units, etc.; also ethylene oxide condensates of long-chained or branched chain amines, such as dodecylamine, hexadecylamine, and octadecylamine, containing 6 to 60 oxyethylene groups; block copolymers of ethylene oxide and propylene oxide comprising a hydrophobic propylene oxide section combined with one or more hydrophilic ethylene oxide sections.

As stated hereinabove, either the polymer or the dispersing agent or both must contain carboxylate groups.

If the polymer contains such groups, but there are no such groups in the dispersing agent, the proportion of polymerized units containing the acid groups within the polymer should be at least 3% by weight, and is preferably about 5% to 10% by weight or even more up to 20% or so, provided the copolymer has compensating hydrophobic groups to avoid their becoming water-soluble. Any olefinically unsaturated carboxylic acid may be utilized including monocarboxy and polycarboxy, monoolefinic, and polyolefinic acids including, for example, such widely divergent materials as acrylic acid, itaconic acid, citraconic acid, aconitic acid, the alpha-alkyl arcrylic acids, crotonic acid, beta-acryloxy propionic acid, acryloxy polyhydracryloxy propionic acid having the structure

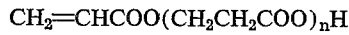

where $n$ is 3 or 4, alpha- and beta-vinyl acrylic acid, alpha-beta isopropylidene propionic acid, sorbic acid, cinnamic acid, maleic acid, oleic acid, undecylenic acid, ricinoleic acid, linoleic acid, linolenic acid and others.

Best results are obtained by the utilization of one or more olefinically-unsaturated carboxylic acids containing only one activated olefinic carbon-to-carbon double bond, that is, an acid containing an olefinic double bond which readily functions in an addition polymerization reaction because of the olefinic double bond being present in the monomer molecule either in the alpha-beta position with respect to a carboxyl group thusly

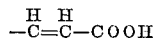

or attached to a terminal methylene grouping thusly

Illustrative alpha-beta unsaturated carboxylic acids within the above-described preferred class include maleic acid, fumaric acid, crotonic acid, alpha-butyl crotonic acid, angelic acid, hydrosorbic acid, cinnamic acid, m-chloro cinnamic acid, p-chloro cinnamic acid, umbellic acid, beta-benzal acrylic acid, beta-methyl acrylic acid (isocrotonic acid or 2-butenoic acid), and other monoolefinic monocarboxylic acids; sorbic acid, alpha-methyl sorbic acid, alpha-ethyl sorbic acid, alpha-chloro sorbic acid, alpha-bromo sorbic acid, beta-chloro sorbic acid, alpha-beta-, or gamma-, epsilon dimethyl sorbic acid, alpha-methyl-gamma-benzal crotonic acid.

Olefinically-unsaturated carboxylic acids containing the

structure include acrylic acid, alpha-chloro acrylic acid, methacrylic acid, ethacrylic acid, alpha-isopropylidene acrylic acid, alpha-styryl acrylic acid (2-carboxy-4-phenyl butadiene-1,3), beta-vinyl acrylic acid (1 - carboxy-butadiene - 1,3), alpha-vinyl acrylic acid, beta-acryloxy propionic acid, beta- acryloxy acetic acid, and others.

Most desirable polymers are obtained by interpolymerizing a monoolefinic monocarboxylic acid having its olefinic double bond in alpha-beta position to the carboxyl group and present in a terminal methylene grouping, such as the acrylic and alpha-substituted acrylic acids including acrylic acid, methacrylic acid, ethacrylic acid, alpha-chloro acrylic acid, itaconic acid, and the like.

If the polymer contains no carboxyl groups either in the form of acid or salt of an alkali metal or ammonium hydroxide, the dispersant must include a plurality of carboxylate groups, preferably in the form of a salt of an alkali metal or ammonium hydroxide. Examples of such dispersants include the salts of the type just mentioned of copolymers, having a molecular weight up to about 5,000, and preferably from about 750 to 5,000 of maleic acid (or anhydride) or maleamic acid with styrene, vinyl ethers, or ethylenically unsaturated hydrocarbons having from 5 to 10 carbon atoms. Examples of such hydrocarbons include 1-amylene, isoamylene, 1-hexane, diisobutylene, 1-decene, dicyclopentadiene, β-pinene, and limonene. When the carboxylate is in the dispersant alone, the polycarboxy-containing dispersant used should be present in an amount of at least 3% by weight, based on the polymer weight, and it may be as high as 40% on the polymer. Other anionic and non-ionic dispersing agents may be present besides the carboxylate type just mentioned.

When the carboxylate groups are present in both the polymer and the dispersant, the sum of the weight of carboxyl-containing units in the polymer plus the weight of dispersant should be at least about 3% based on the weight of polymer.

The aqueous dispersion or latex of the polymer may be prepared in any suitable fashion and may have a concentration of ½ to 70% solids but preferably is in the range of about 15 to 45% solids. To the latex containing the carboxylate groups either in the polymer or in the dispersant or in both, there is added a surface-hardening metal ion, such as a monovalent heavy metal ion, for example, silver, cuprous, or mercurous ion, which forms a water-insoluble carboxylic salt, or a polyvalent metal ion. The latter ion may be the polyvalent copper or mercury ion or it may be an ion of calcium, magnesium, strontium, barium, aluminum, lead, zirconium, cerium, cobalt, chromium, zinc, iron, manganese, nickel or tin. The surface-hardening metal ion source may be added to the aqueous dispersion as an oxide, a hydroxide, a basic salt, or a neutral or acidic salt. The source of the ions should be such that the oxide, hydroxide or salt added is sufficiently soluble in the medium under the conditions of acidity or alkalinity prevailing that there will be appreciable linking of the surface-hardening metal ions produced in the aqueous medium with the carboxylate groups in the polymer or dispersant to form a protective layer or "skin" around the polymer particles which prevents fusion of the particles together on drying. The amount of the surface-hardening metal ions used may be the stoichiometric equivalent (or more, such as twice or three times the equivalent) of the carboxylate groups available on the polymer and/or the dispersant if the amount of such carboxylate groups is at or near the minimum required as specified hereinabove. However, when a greater amount of the carboxylate groups is available, somewhat less than the stoichiometric equivalent may even be employed if desired. The pH of the aqueous dispersion to which the surface-hardening metal ion is added may be from 2 to 11. The oxide or hydroxide, such as calcium hydroxide, is preferably added to the acidic dispersion at a pH in the range of 2 to 7. However, at pH values of 6 to 10, it is preferable to add the surface-hardening metal ion in the form of a salt, preferred examples being calcium chloride or aluminum sulfate. Other desirable salts include the acetates, nitrates, bromides, and iodides of the various polyvalent metals mentioned above.

After introducing the surface-hardening metal ion, substantially all of the water is removed from the polymer while maintaining conditions, such as of temperature and pressure, under which the polymer does not coalesce. When the addition of the metal ion flocculates the latex, the flocculated material is filtered and then dried. The drying may simply be effected at room temperature and pressure, although it may be aided by vacuum or application of heat. If the latex is so stable, as a result of the presence of an efficient emulsifier or other factors, that the addition of the surface-hardening metal ion does not flocculate the polymer, the system may be subjected to freeze-drying or spray-drying. If it is desired to employ spray-drying and the introduction of the surface-hardening metal ion coagulates the latex as intially obtained, the latex may first be stabilized by post-addition of a suitable emulsifier, especially of non-ionic type, before the addition of the metal ion so that the latter does not coagulate the polymer in the latex. In those cases where spray-drying or drying at elevated temperature is to be resorted to, it may be desirable to increase the amount of carboxylate and/or surface-hardening metal ion to resist any tendency to coalesce at the elevated temperatures employed.

The resulting dried product contains a particulate polymer which can be subjected to a grinding or other pulverizing operation but is capable, even without such pulverization, of producing on redispersion in an aqueous medium a polymer latex in which the particles have essentially the same size distribution as in the original emulsion polymer dispersion.

In order to redisperse the polymers to produce the latex with a particle size essentially the same as the original latex, it is merely necessary to add a material which withdraws the surface-hardening metal ion by forming an insoluble salt therewith or by forming a complex ion therewith. Thus there may be added a water-soluble carbonate or bicarbonate, such as of an alkali metal or ammonium, or a sequestering agent of salt type for the surface hardening metal ion. Any suitable salt-type of sequestering agent or complexing agent which serves to withdraw the polyvalent metal ion from the scene of the aqueous medium may be employed; for example, alkali metal salts of alkylenepolyaminepolyacetates, such as sodium ethylenediaminetetraacetate may be used. Again, the salts disclosed in U.S. Patent 2,825,714 can be used. Examples thereof include polymers containing from 1 to 100 mole percent and preferably at least 50 mole percent of units having the formula

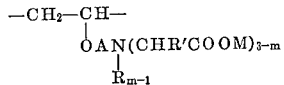

where A is an alkylene group of 2 to 18 carbon atoms having at least two of such carbon atoms in a chain separating the ether oxygen and amino nitrogen, $m$ is an integer having a value of 1 to 2, R is H or an alkyl group of 1 to 12 carbon atoms including cyclohexyl, R' is H or methyl, and M is selected from the group consisting of $NH_4$, and alkali metals. Preferred polymers having sequestering properties are those containing 60 to 100 mole percent of units of the formula

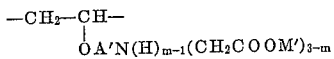

where A' is an alkylene group of 2 to 3 carbon atoms, $m$ is 1 or 2 and M' is $NH_4$, or an alkali metal.

Other sequestering agents include any water-soluble salts having the following anions: pyrophosphates, tripolyphosphates, citrates, tartrates, oxalates, glyconates, glycollates, and gluconates. The alkali metal salts, such as of sodium, potassium, and lithium, and the ammonium salts are especially useful.

The agent for withdrawing the surface-hardening ions, such as the sequestering agent may be added in the form of a dry pulverized material just before the polymer powder is to be redispersed in the aqueous medium in which it is to be used. Alternatively, a dry powdered withdrawing agent may be thoroughly mixed with the polymer powder shortly after the drying of the latter powder and before shipment so that the user who purchases the polymer powder need only add it to the aqueous medium to prepare the dispersed polymer latex. Instead of mixing the withdrawing agent with the dry polymer powder, the withdrawing agent may be dissolved in the aqueous medium into which the dry polymer powder is to be redispersed. The proportion of withdrawing agent added is preferably the amount needed to remove all of the surface-hardening metal ions from the surface of the polymer particles on redispersion but the mole ratio of withdrawing agent to surface-hardening metal may be as low as 0.7. In other words, the amount employed is preferably the stoichiometric equivalent of the surface-hardening metal ions present or added.

Dry powder containing the particles of the polymer and the surface-hardening metal salt of the polymer and/or dispersant can be shipped to the point of use and has the advantage that it is unnecessary to pay the expense of shipping the aqueous medium. In applications wherein a water-dispersible polymer is to be used with dry materials, such as inorganic cements, it is quite advantageous to have the dispersible polymer in dry form adapted to be mixed with the dry cement so that there is no need to provide a separate package of wet latex to be sold with the cement package and mixed by the consumer when the cement is used. The dry, pulverulent polymer is redispersible, in the presence of an agent for withdrawing the surface-hardening ions, such as the sequestering agent as explained hereinafter, to essentially the same character of latex with respect to particle size distribution as the original from which it is made.

The invention thus provides a dry polymer powder which may be redispersed to form a latex capable of all of the uses normally filled by such latices. Thus, they may be employed for impregnating and coating leather, paper, textiles including woven, knitted, non-woven, braided and other types of textiles; for the coating and impregnating of other porous materials such as wood, stone, asbestos-cement products, bricks, and unglazed ceramics, as additives to hydraulic cements, spinning solutions for the production of viscose or cuprammonium rayons, casein solutions, and polymer latices to be formed into artificial filaments or films. The products obtained from the dispersed latices are fully as good, and in some cases, improved, with respect to similar products made from the original latices. The capacity of the dry powders to be redispersed in essentially the same particle size distribution as was present in the original latices assures the production of films, coatings and impregnations of uniform character and assures uniform distribution of the polymer throughout other materials, such as hydraulic cements, into which the polymer is incorporated.

In the following examples which are illustrative of the present invention, the parts and percentages are by weight unless otherwise indicated.

EXAMPLE 1

To 100 parts of an ethyl acrylate/methyl methacrylate/itaconic acid (87/10/3 weight ratio) terpolymer latex having 5% (on polymer weight) octylphenoxypoly(40) ethoxyethanol (non-ionic emulsifier) and 45% solids there was added 18 parts of a diisobutylene/maleic anhydride copolymer in its half-amide-half ammonium salt form. While the mixture was agitated, 57 parts of a 10% solution of calcium chloride (equimolar based on maleic) was added. One portion of the smooth flocculated polymer slurry was dried in a 60° C. oven to a hard crust which was then in turn pulverized to small granules. Another portion of the polymer slurry was spray-dried in a hot chamber to give a fine, free-flowing powder of 0.404 g./ml. bulk density.

These powders, though not dispersible in water, dispersed readily in an aqueous solution of the pentasodium salt of diethylenetriamine pentaacetic acid. These proportions were used: 35 parts of the dry powder, 25 parts of the sequestering agent and 150 parts of water. ($Ca^{++}$/sequestering agent mole ratio used was 1/0.8.) The reconstituted latex was stable and had a particle size identical to that of the original latex (as determined by a standard ultracentrifuge method). The latex forms a continuous polymer film when air-dried.

EXAMPLE 2

In a similar manner as described in Example 1 a flocculated mixture was obtained using the following three components: (1) an ethyl acrylate/styrene/methacrylic acid 65/30/5 terpolymer latex containing 1.0% sodium dodecyl sulfate and of 30% solids; (2) 10 parts (based on polymer) of the diisobutylene-maleic dispersant described in Example 1; and (3) an equimolar quantity (based on the total carboxyl groups) of either $Ca(OH)_2$, Ba(OH)₂ or Zn(OH)₂. The flocculated polymer was air-dried at room temperature to a hard solid which redispersed spontaneously to a stable latex in a 4.0% solution of tetrasodium ethylenediaminetetraacetate (1 part powder and 20 parts solution).

EXAMPLE 3

To 300 parts of an ethyl acrylate/methyl methacrylate/methacrylic acid (66/24/10) terpolymer latex containing 6% octylphenoxypoly(40)ethoxyethanol and of 33.3% solids was added 9 parts Ca(OH)₂ suspended in 100 parts of water with agitation. The resulting mixture, in which the polymer was not coagulated but was still stably dispersed, was spray-dried in a 170–180° C. chamber, yielding a white, free-flowing powder. The powder redispersed spontaneously in 5.0% solutions of trisodium-N-hydroxyethylethylenediamine-triacetate in one instance and in sodium polyphosphate in another to give stable dispersions (1 part powder and 10 parts solution).

EXAMPLE 4

A dry blend of the dispersible powder described in Example 3 with cement was made:

|  | Special Formulation | Ordinary Formulation |
| --- | --- | --- |
| Dry Blend: |  |  |
| Sand | 825 | 825 |
| Cement | 275 | 275 |
| Dispersible powder | 27.5 |  |
| Versene 100 (the sequestering agent used in Example 1) | 5.3 |  |
| Water | 155 | 150 |

The cement mixes were separately homogenized with water and each was allowed to set on plywood for four hours. The hard cement resulting from the special formulation had good adhesion to the board and had excellent strength. The ordinary formulation, without the polymer additive, had poor adhesion and was comparatively rather weak in mechanical strength.

EXAMPLE 5

To 200 parts of vinyl acetate/ethyl acrylate (90/10) copolymer latex containing 2.5% of sodium dodecylbenzene sulfonate and 35% solids was added 25 parts of a hydrolyzed diisobutylene/maleic copolymer in its sodium salt form. The mixture was agitated and 132 parts of a 5% solution of calcium chloride was added slowly. The slurry was dried in a 50–55° C. oven to a dry crust which was pulverized. The powdery material redispersed in 200 parts of 6.5% solution of the sodium salt of poly(vinyloxyethylaminediacetic acid) to a stable latex.

EXAMPLE 6

To 100 parts of an ethyl acrylate/methyl methacrylate/methacrylic acid (53/42/5) terpolymer latex containing 3.5% octylphenoxypoly(40)ethoxyethanol and having 36.0% solids was added 1.55 parts Ca(OH)₂ with agitation. The resulting mixture was spray-dried in a 100° C. chamber yielding a white free-flowing powder. This powder was mixed with powdered sodium citrate dihydrate in the proportion 10 parts powder to 1.7 parts sodium citrate. When this mixture was added to water, a stable dispersion resulted.

EXAMPLE 7

To 100 parts of an ethyl acrylate/methyl methacrylate/acrylic acid (49.0/46.7/4.3) terpolymer latex containing 4.0% octylphenoxypoly(40)ethoxyethanol and of 36.0% solids was added 1.55 parts Ca(OH)₂ with agitation. The resulting mixture was spray-dried in a 100° C. chamber yielding a white, free-flowing powder. Ten parts of powder were dispersed readily to a stable emulsion in 100 parts of water and 0.6 parts of sodium glycolate.

EXAMPLE 8

To 100 parts of an ethyl arcrylate/styrene/methacrylic acid (40/52/8) terpolymer latex containing 1.0% sodium lauryl sulfate and of 39.0% solids was added with agitation 6.2 parts AgNO₃ dissolved in 24.8 parts of water. The fluocculated polymer was air-dried at room temperature to a coarse powder which redispersed to a stable latex with the addition of 1.0 part (NH₄)₂CO₃ dissolved in 100 parts of water to 10 parts of the powder.

I claim:

1. A process for producing a dry particulate, water-insoluble polymer which is dispersible in water which comprises incorporating surface-hardening metal ions selected from the group consisting of silver, cuprous, mercurous and polvalent metal ions into an aqueous dispersion of an emulsion copolymer of monoethylenically unsaturated monomers selected from the group consisting of the nitriles, amides and esters of acrylic acid and methacrylic acid, styrene, acrylic acid, methacrylic acid, and itaconic acid and a dispersing agent for the polymer, which dispersion contains carboxylate groups in the dispersed polymer or in the dispersing agent for the polymer or in both the polymer and the dispersing agent, the carboxylate groups being of the formula —COOM wherein M is selected from the group consisting of H, NH₄ and alkali metals, the sum of (1) the weight percent in the polymer of the units of the polymer containing carboxylate groups and (2) the weight percent, based on the polymer weight, of carboxylate-containing dispersant being at least 3%, and the amount of surface-hardening metal ions being at least the stoichiometric equivalent of the minimum amount of carboxylate groups required by definition herein and being sufficient to form a layer of metal carboxylate groups between particles capable of preventing cohesion of the underlying polymer particles on drying, and then removing substantially all of the water from the polymer while maintaining conditions of temperature and pressure under which the polymer does not coalesce.

2. A process as defined in claim 1 which comprises the step of mixing a dry salt-type agent for withdrawing the surface-hardening ions with the dry polymer in an amount equivalent to the surface-hardening metal ion.

3. A process as defined in claim 1 in which the removal of water is effected by spray-drying.

4. A process as defined in claim 1 which comprises the step of mixing a dry, water-insoluble carbonate or bicarbonate or a dry salt-type sequestering agent with the dry polymer in an amount equivalent to the silver, cuprous, mercurous, or polyvalent metal ion.

5. A process as defined in claim 1 in which the removal of water is effected by spray-drying.

6. A process for producing a dry particulate, water-insoluble polymer which is dispersible in water which comprises incorporating silver, cuprous, or mercurous ions into an aqueous dispersion of an emulsion copolymer of monoethylenically unsaturated monomers selected from the group consisting of the nitriles, amides and esters of acrylic acid and methacrylic acid, styrene, acrylic acid, methacrylic acid, and itaconic acid and a dispersing agent for the polymer, which dispersion contains carboxylate groups in the dispersed polymer or in the dispersing agent for the polymer or in both the polymer and the dispersing agent, the carboxylate groups being of the formula —COOM wherein M is selected from the group consisting of H, NH₄ and alkali metals, the sum of (1) the weight percent in the polymer of the units of the polymer containing carboxylate groups and (2) the weight percent, based on the polymer weight, of carboxylate-containing dispersant being at least 3%, and the amount of metal ions being at least the stoichiometric equivalent of the minimum amount of carboxylate groups required by definition herein and being sufficient to form a layer of metal carboxylate groups between particles capable of preventing cohesion of the underlying polymer particles on drying, and then removing substantially all of the water from the polymer while maintaining conditions of temperature and pressure under which the polymer does not coalesce.

7. A process as defined in claim 6 which comprises the step of mixing a dry, water-soluble metal carbonate or bicarbonate with the dry polymer in an amount equivalent to the silver, cuprous, or mercurious metal ion.

8. A process as defined in claim 6 in which the removal of water is effected by spray-drying.

9. A process as defined in claim 6 which comprises the step of mixing a dry sequestering agent in salt form with the dry polymer in an amount equivalent to the metal ion.

10. A process as defined in claim 9 in which the removal of water is effected by spray-drying.

11. A process for producing a dry particulate, water-insoluble polymer which is dispersible in water which comprises incorporating polyvalent metal ions into an aqueous dispersion of an emulsion copolymer of monoethylenically unsaturated monomers selected from the group consisting of the nitriles, amides and esters of acrylic acid and methacrylic acid, styrene, acrylic acid, methacrylic acid, and itaconic acid and a dispersing agent for the polymer, which dispersion contains carboxylate groups in the dispersed polymer or in the dispersing agent for the polymer or in both the polymer and the dispersing agent, the carboxylate groups being of the formula —COOM wherein M is selected from the group consisting of H, $NH_4$ and alkali metals, the sum of (1) the weight percent in the polymer of the units of the polymer containing carboxylate groups and (2) the weight percent, based on the polymer weight, of carboxylate-containing dispersant being at least 3%, and the amount of polyvalent metal ions being at least the stoichiometric equivalent of the minimum amount of carboxylate groups required by definition herein and being sufficient to form a layer of polyvalent metal carboxylate groups between particles capable of preventing cohesion of the underlying polymer particles on drying, and then removing substantially all of the water from the polymer while maintaining conditions of temperature and pressure under which the polymer does not coalesce.

12. A process as defined in claim 11 which comprises the step of mixing a dry, water-soluble metal carbonate or bicarbonate with the dry polymer in an amount equivalent to the polyvalent metal ion.

13. A process as defined in claim 11 in which the removal of water is effected by spray-drying.

14. A process as defined in claim 11 which comprises the step of mixing a dry sequestering agent in salt form with the dry polymer in an amount equivalent to the polyvalent metal ion.

15. A process as defined in claim 12 in which the removal of water is effected by spray-drying.

16. As an article of manufacture, a dry mixture of a particulate, water-insoluble copolymer of monoethylenically unsaturated monomers selected from the group consisting of the nitriles, amides and esters of acrylic acid and methacrylic acid, styrene, acrylic acid, methacrylic acid, and itaconic acid and dispersing agent thereof, polyvalent metal carboxylate groups disposed on the surfaces of the particles and being chemically combined in the polymer particles or in the dispersing agent or in both the polymer and the dispersing agent, the polyvalent metal carboxylate groups serving to prevent coalescence of the individual polymer particles.

17. As an article of commerce, a dry mixture of a salt-type sequestering agent for polyvalent metal ions, a particulate, water-insoluble copolymer of monoethylenically unsaturated monomers selected from the group consisting of the nitriles, amides and esters of acrylic acid and methacrylic acid, styrene, acrylic acid, methacrylic acid, and itaconic acid and a dispersing agent therefor, polyvalent metal carboxylate groups disposed on the surfaces of the particles and being chemically combined in the polymer particles or in the dispersing agent or in both the polymer and the dispersing agent, the polyvalent metal carboxylate groups serving to prevent caolescence of the individual polymer particles, the amount of sequestering agent being equivalent to the polyvalent metal in the aforesaid carboxylate groups.

18. A process for producing an aqueous dispersion of a polymer from a dry mixture of a particulate, water-insoluble copolymer of monoethylenically unsaturated monomers selected from the group consisting of the nitriles, amides and esters of acrylic acid and methacrylic acid, styrene, acrylic acid, methacrylic acid, and itaconic acid and a dispersing agent therefor, polyvalent metal carboxylate groups disposed on the surfaces of the particles and being chemically combined in the polymer particles or in the dispersing agent or in both the polymer and the dispersing agent, which comprises mixing the dry mixture with water and a salt-type sequestering agent for the polyvalent metal.

19. A process which comprises the steps of emulsion copolymerizing monoethylenically unsaturated monomers selected from the group consisting of the nitriles, amides and esters of acrylic acid or of methacrylic acid, styrene, acrylic acid, methacrylic acid, and itaconic acid in an aqueous medium using an emulsifying or dispersing agent selected from the group consisting of anionic and nonionic agents, carboxylate groups of the formula —COOM in which M is selected from the group consisting of H, $NH_4$ and alkali metals being present in a monomer or in the dispersing agent or in both a monomer and the dispersing agent, the sum of (1) the weight percent in the polymer of units of the polymer derived from the monomer containing the aforesaid carboxylate groups and (2) the weight percent, based on the weight of polymer obtainable from the monomer, of carboxylate-containing dispersing agent being at least 3%, adding a water-soluble polyvalent metal compound to the dispersion in an amount to coagulate the polymer and to provide in the dispersion an amount of polyvalent metal ions at least the stoichiometric equivalent of the minimum of carboxylate groups required by definition herein and sufficient to form a layer of polyvalent metal carboxylate groups between particles capable of preventing cohesion of the underlying polymer particles on drying, and removing substantially all of the water from the coagulated polymer while maintaining conditions of temperature and pressure under which the polymer does not coalesce.

20. The process as defined in claim 19 in which a dry sequestering agent in salt form is mixed with the coagulated polymer mass from which water has been removed, and the mixture is subsequently mixed with water to redisperse the polymer, the amount of sequestering agent being equivalent to the polyvalent metal.

21. The process as defined in claim 19 in which a sequestering agent and the coagulated polymer mass from which the water has been removed are mixed into an aqueous medium to redisperse the polymer as particles in essentially the same particle size distribution as in the original polymer dispersion produced by emulsion polymerization, the amount of sequestering agent being equivalent to the polyvalent metal.

22. As an article of manufacture, a dry mixture of a particulate, water-insoluble copolymer of monoethylenically unsaturated monomers selected from the group consisting of the nitriles, amides and esters of acrylic acid and methacrylic acid, styrene, acrylic acid, methacrylic acid, and itaconic acid and a dispersing agent therefor, silver, cuprous, or mercurous carboxylate groups disposed on the surfaces of the particles and being chemically combined in the polymer particles or in the dispersing agent or in both the polymer and the dispersing agent, the silver, cuprous, or mercurous carboxylate groups serving to prevent coalescence of the individual polymer particles.

23. As an article of commerce, a dry mixture of a water-soluble carbonate or bicarbonate, a particulate, water-insoluble copolymer of monoethylenically unsaturated monomers selected from the group consisting of the nitriles, amides and esters of acrylic acid and methacrylic acid, styrene, acrylic acid, methacrylic acid, and itaconic acid and a dispersing agent therefor, polyvalent metal carboxylate groups disposed on the surfaces of the particles and being chemically combined in the polymer particles or in the dispersing agent or in both the polymer and the dispersing agent, the polyvalent metal carboxylate groups serving to prevent coalescence of the individual polymer particles, the amount of carbonate or bicarbonate being equivalent to the polyvalent metal in the aforesaid carboxylate groups.

24. As an article of commerce, a dry mixture of a water-soluble carbonate or bicarbonate, a particulate, water-insoluble copolymer of monoethylenically unsaturated monomers selected from the group consisting of the nitriles, amides and esters of acrylic acid and methacrylic acid, styrene, acrylic acid, methacrylic acid, and itaconic acid and a dispersing agent therefor, silver, cuprous, or mercurous carboxylate groups disposed on the surfaces of the particles and being chemically combined in the polymer particles or in the dispersing agent or in both the polymer and the dispersing agent, the silver, cuprous, or mercurous carboxylate groups serving to prevent coalescence of the individual polymer particles, the amount of carbonate or bicarbonate being equivalent to the silver, cuprous, or mercurous metal in the aforesaid carboxylate groups.

25. As an article of commerce, a dry mixture of a salt-type sequestering agent for metal ions, a particulate, water-insoluble copolymer of monoethylenically unsaturated monomers selected from the group consisting of the nitriles, amides and esters of acrylic acid and methacrylic acid, styrene, acrylic acid, methacrylic acid, and itaconic acid and a dispersing agent therefor, silver cuprous, or mercurous carboxylate groups disposed on the surfaces of the particles and being chemically combined in the polymer particles or in the dispersing agent or in both the polymer and the dispersing agent, the silver, cuprous, or mercurous carboxylate groups serving to prevent coalescence of the individual polymer particles, the amount of sequestering agent being equivalent to the metal in the aforesaid carboxylate groups.

References Cited

UNITED STATES PATENTS

| 3,092,600 | 6/1963 | Ozawa et al. | 260—29.6 |
| 3,255,132 | 6/1966 | Reinecke | 260—29.6 |

FOREIGN PATENTS 568,554   1/1959   Canada.

MURRAY TILLMAN, *Primary Examiner.*

W. J. BRIGGS, Sr., *Assistant Examiner.*